(12) United States Patent
Whitney, Jr.

(10) Patent No.: US 7,222,425 B2
(45) Date of Patent: May 29, 2007

(54) METHOD OF FORMING ENGINE BEARING

(75) Inventor: Warren J. Whitney, Jr., Ypsilanti, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 23 days.

(21) Appl. No.: 11/167,549

(22) Filed: Jun. 27, 2005

(65) Prior Publication Data

US 2005/0229396 A1    Oct. 20, 2005

Related U.S. Application Data

(62) Division of application No. 10/264,938, filed on Oct. 3, 2002, now Pat. No. 6,942,389.

(51) Int. Cl.
*B21D 53/10* (2006.01)
*F16C 33/00* (2006.01)

(52) U.S. Cl. .............. 29/898.059; 29/898; 29/898.054; 29/898.047; 29/898.13

(58) Field of Classification Search ................ 29/898, 29/898.04, 898.042, 898.047, 898.054, 898.059, 29/898.06, 898.13, 898.14; 384/625, 276, 384/294

See application file for complete search history.

(56) References Cited

U.S. PATENT DOCUMENTS

| | | | |
|---|---|---|---|
| 2,734,024 A * | 2/1956 | Schultz ...................... 205/176 |
| 4,454,740 A * | 6/1984 | Neal et al. ...................... 72/53 |
| 4,659,241 A * | 4/1987 | Bamberger et al. .......... 384/625 |
| 4,718,155 A * | 1/1988 | Warriner et al. .......... 29/898.12 |
| 4,996,025 A * | 2/1991 | Pratt et al. ................... 420/554 |
| 5,072,092 A | 12/1991 | Richter et al. |
| 5,131,957 A | 7/1992 | Epstein et al. |
| 5,584,586 A | 12/1996 | Casarcia et al. |
| 5,879,480 A | 3/1999 | Hetzner |
| 5,882,438 A | 3/1999 | Luchner et al. |
| 6,197,133 B1 * | 3/2001 | Unternahrer et al. ........ 148/525 |
| 6,200,689 B1 | 3/2001 | Ferrigno et al. |
| 6,215,097 B1 | 4/2001 | Mannava |
| 6,655,026 B1 * | 12/2003 | Iida et al. ................. 29/888.09 |
| 6,670,577 B2 * | 12/2003 | Staver et al. ........... 219/121.85 |
| 6,735,868 B2 * | 5/2004 | Loose et al. ............. 29/898.13 |
| 6,854,183 B2 * | 2/2005 | Greene et al. ......... 29/898.058 |
| 6,942,389 B2 * | 9/2005 | Whitney ..................... 384/294 |

\* cited by examiner

*Primary Examiner*—Essama Omgba
(74) *Attorney, Agent, or Firm*—Robert L. Stearns; Dickinson Wright PLLC

(57) ABSTRACT

A journal bearing has a lining of bearing metal applied to a steel backing. The surface of the lining is laser peen hardened to locally increase the hardness and the seizure resistance of the lining. The underlying core of the lining is unaffected and maintains good conformability of the lining. The overall lining thus possesses both good seizure resistance and conformability.

14 Claims, 1 Drawing Sheet

METHOD OF FORMING ENGINE BEARING

This application is a division of U.S. application Ser. No. 10/264,938, filed on Oct. 3, 2002 now U.S. Pat. No. 6,942,389.

BACKGROUND OF THE INVENTION

1. Technical Field

This invention relates generally to journal or engine bearings for internal combustion engines, and more particularly to the construction of linings for journal bearings.

2. Related Art

Sliding-type journal or engine bearings are typically used in internal combustion engine applications for journaling a shaft of the engine. Typical engine bearings have an arcuate steel backing onto which one or more layers of relatively softer bearing metal is applied.

The steel backing provides structural rigidity to the bearing whereas the applied bearing layer or layers provide a low friction sliding surface that must exhibit a combination of seemingly incompatible properties of acceptable wear and fatigue resistance, and acceptable conformability and seizure-resistance. The first two properties call for a hard, strong bearing material, whereas conformability and seizure resistance call for a softer material of lesser strength. It is generally accepted that no one material can satisfy all criteria, since a material cannot be both hard and soft. Accordingly, the current practice is to select a material, or multiple layer materials, that compromise between the competing properties. However, the demand for ever-increasing performance of engine bearings continues to challenge ability to provide a suitable "compromise" bearing material at an acceptable cost.

Modern bearings and those of the future require ever-increasing wear and fatigue resistance properties without sacrificing the conformability of the bearings. As the demands of these competing properties get driven further apart, a suitable compromise material(s) is becoming more difficult to attain.

It is an object of the present invention to overcome or greatly minimize the foregoing limitations of prior engine bearings.

SUMMARY OF THE INVENTION

An engine bearing for an internal combustion engine has a lining with a hardened surface layer providing the journal bearing with an extended life in use. The bearing has an arcuate backing comprised of a first material having an outer surface and an inner surface. A lining comprised of a second material different from the first material is fixed to the inner surface of the backing. According to the invention, the lining is laser peened (also known as "laser shock hardened") to impart compressive residual stresses in a surface region to produce a hardened skin with enhanced fatigue and wear resistance while an underlying core of the lining is unaffected and possesses good conformability and seizure resistance.

One advantage of the present invention is that a journal type bearing is provided having an extended life in use.

Another advantage of the invention is that a greater variety of bearing metals are available that can satisfy the competing properties of fatigue resistance and conformability.

THE DRAWINGS

These and other features and advantages of the present invention will become more readily appreciated when considered in connection with the following detailed description and appended drawings, wherein.

DETAILED DESCRIPTION

Figure 1:
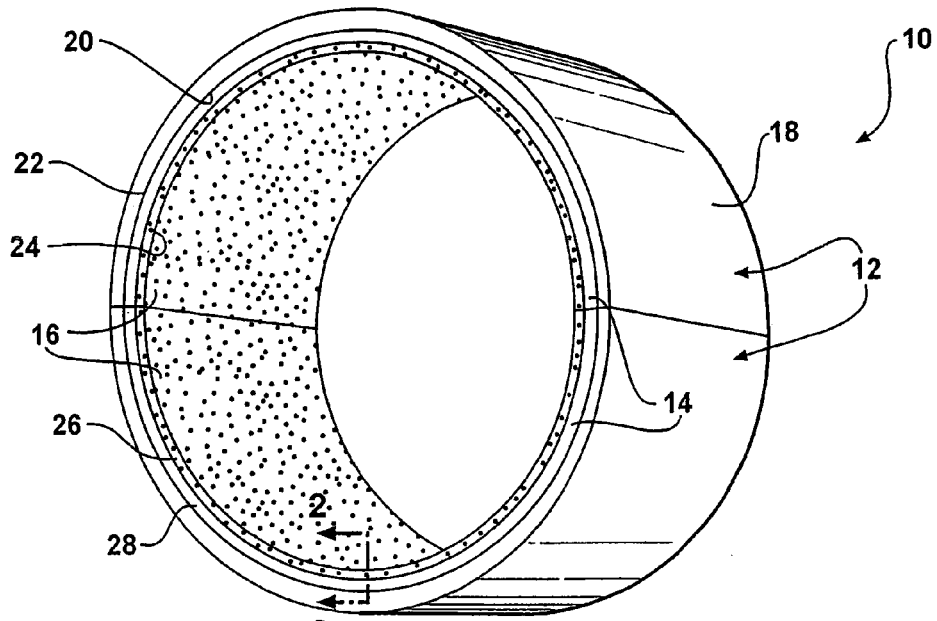
FIG. 1 is a perspective view of a presently preferred embodiment of a journal bearing embodying the present invention.
Figure 2:
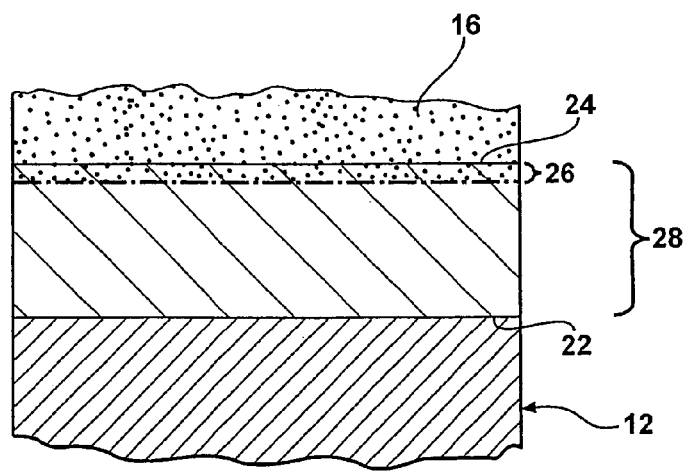
FIG. 2 is a cross sectional view taken along the line 2—2 of FIG. 1.
Figure 3:
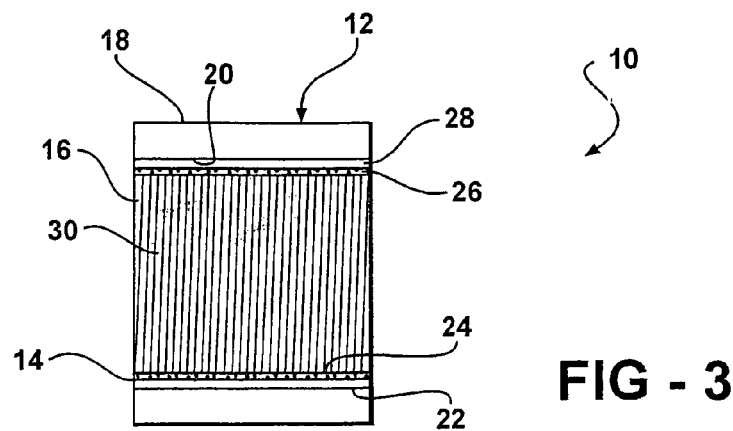
FIG. 3 is an enlarged and magnified plan view of one-half of the journal bearing of FIG. 1.

A presently preferred embodiment of a journal bearing constructed according to the present invention is shown generally at 10 in FIGS. 1–3. The journal bearing 10 has a backing plate 12 and a lining 14. The backing plate 12 provides rigidity to the journal bearing 10.

The backing plate 12 is formed of a first material, preferably steel, and has an outer arcuate convex surface 18 and an inner arcuate concave surface 20.

The lining 14 is formed from a second lining material different than that of the backing plate material. Preferably, the lining material comprises either an aluminum-based or copper-based alloy material. The lining 14 has a first side 22 and a second side 24. The first side 22 of the lining 14 is fixed to the inner surface 20 of the backing plate 12. The second side 24 of the lining 14 defines an inner arcuate bearing surface 16 that is spaced radially inwardly from the backing plate 12.

To improve the strength characteristics of the bearing surface 16, the second side 24 of the lining 14 is treated by laser peening or laser shock peening, which is known per se for the treatment of materials generally, but not known in connection with engine bearings to increase fatigue resistance while preserving conformability and seizure resistance of a bearing lining material. The laser peened treatment induces residual compressive stresses which serve to locally harden outer layer region 26 of the lining 14. The hardened layer 26 improves the fatigue resistance of the bearing surface 16 by inhibiting crack initiation and propagation within and through the bearing surface 16. As a result, the service life of the journal bearing 10 is extended.

The laser surface peening process subjects the second side 24 of the lining 14 to a laser pulse with a power density of approximately 1 gigawatt/cm$^2$ with an interaction time of approximately 1 microsecond.

The lining 14 has a non-laser peened layer or core 28 between the hardened layer 26 and the backing 12. Typically, upon laser peening the second side 24, the hardened layer 26 takes on a hardness value ranging anywhere between 0–5 points on the Vickers scale greater than the hardness of the core 28, though this range can be increased depending on the laser surface peening parameters. Though the bearing surface 16 is harder than the core layer 28 of the lining 14, the bearing surface 16 and core 28 retain a combined desirable level of conformability, with the core 28 exhibiting greater conformability than that of the hardened layer 26.

The hardened layer 26 preferably extends to a depth of about 20 to 50 micrometers below the surface 16. As such, the conformability of the core 28, and thus the overall lining is largely unaffected, as the conformability has been formed to be influenced primarily within a depth of ¼–½ mm below the bearing surface 16. Conformability of the journal bearing is particularly beneficial in applications that are prone to misalignment of the shaft relative to the journal bearing, thus causing an effect commonly referred to as "edge loading." In addition, any imperfections in machining of the shaft, such as a crank shaft in an internal combustion engine, can reduce the useful life of the journal bearing 10 if adequate conformability is not provided in the lining 14 of the journal bearing 10.

In journal bearing applications it is common for contaminants or debris to come in contact with the journal bearing 10. Thus, it is desirable to provide journal bearings that can operate in the presences of contaminants or debris without negatively impacting the useful life of the journal bearings. The journal bearing 10, having a bearing surface 16 and a hardened layer 26 does not impair the embedability properties of the journal bearing 10 to retain contamination or debris within the bearing surface 16.

According to a further aspect of the invention, the laser peening may be advantageously controlled to develop a particular textured surface 30 of the hardened layer 26. For example, as best shown in FIG. 3, the surface texturing 30 provides for circumferentially extending grooves, represented here as a plurality of generally parallel grooves, promoting the retention of lubrication and enhanced hydrodynamic action on the bearing surface 16 of the journal bearing 10. The surface texturing 30 is formed during the laser surface peening process by directing the shock waves to the desired location on the second side 24 of the lining 14. While a grooved texture is illustrated by way of example, the invention contemplates other textures, for example, grooves in other directions, such as axial grooves.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of manufacturing an engine bearing for an internal combustion engine, comprising:
    forming an arcuate metal backing plate;
    forming a lining of bearing metal different than that of the backing plate on the backing plate defining an inner arcuate surface;
    imparting compressive residual stresses within a layer of the lining extending from the inner arcuate surface toward the arcuate metal backing plate; and
    constructing a hardened surface layer and a core within the lining upon imparting compressive residual stresses within the lining, wherein the hardened surface layer is constructed having a hardness about 5 points greater on a Vickers scale than the core of the lining.

2. The method of manufacturing an engine bearing of claim 1 further providing a laser peening operation for imparting the compressive residual stresses within the lining.

3. The method of manufacturing an engine bearing of claim 1 wherein the core is constructed having a hardness less than both the arcuate metal backing plate and the hardened surface layer.

4. The method of manufacturing an engine bearing of claim 1 further comprising constructing a textured surface on the inner arcuate surface.

5. The method of manufacturing an engine bearing of claim 4 wherein the textured surface is constructed as circumferential grooves.

6. The method of manufacturing an engine bearing of claim 1 wherein steel is provided in forming the arcuate metal backing plate.

7. The method of manufacturing an engine bearing of claim 1 wherein an aluminum-based material is provided in forming the lining.

8. A method of manufacturing an engine bearing for an internal combustion engine, comprising:
    forming an arcuate metal backing plate;
    forming a lining of bearing metal different than that of the backing plate on the backing plate defining an inner arcuate surface;
    imparting compressive residual stresses within a layer of the lining extending from the inner arcuate surface toward the arcuate metal backing plate;
    constructing a hardened surface layer and a core within the lining upon imparting compressive residual stresses within the lining, wherein the hardened surface layer is constructed extending about 20 to 50 micrometers below the inner arcuate surface.

9. The method of manufacturing an engine bearing of claim 8 further providing a laser peening operation for imparting the compressive residual stresses within the lining.

10. The method of manufacturing an engine bearing of claim 8 wherein the core is constructed having a hardness less than both the arcuate metal backing plate and the hardened surface layer.

11. The method of manufacturing an engine bearing of claim 8 further comprising constructing a textured surface on the inner arcuate surface.

12. The method of manufacturing an engine bearing of claim 11 wherein the textured surface is constructed as circumferential grooves.

13. The method of manufacturing an engine bearing of claim 8 wherein steel is provided in forming the arcuate metal backing plate.

14. The method of manufacturing an engine bearing of claim 8 wherein an aluminum-based material is provided in forming the lining.

\* \* \* \* \*